United States Patent
Almae

(10) Patent No.: US 11,162,840 B1
(45) Date of Patent: Nov. 2, 2021

(54) METHOD AND KIT FOR DETECTING TECHNETIUM-99M RADIOISOTOPES

(71) Applicant: GIFTEDNESS & CREATIVITY COMPANY, Safat (KW)

(72) Inventor: Nuha H F H Almae, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/235,417

(22) Filed: Apr. 20, 2021

(51) Int. Cl.
*G01J 1/50* (2006.01)
*G01T 1/04* (2006.01)
*G21G 1/00* (2006.01)
*G01N 31/22* (2006.01)
*G01N 21/80* (2006.01)

(52) U.S. Cl.
CPC ............ *G01J 1/50* (2013.01); *G01N 21/80* (2013.01); *G01N 31/221* (2013.01); *G01T 1/04* (2013.01); *G21G 1/001* (2013.01); *G21G 2001/0042* (2013.01)

(58) Field of Classification Search
CPC ........... G21G 2001/0042; G01N 21/78; G01N 21/80; G01N 31/221; G01J 1/50
See application file for complete search history.

(56) References Cited

U.S. PATENT DOCUMENTS

| | | | |
|---|---|---|---|
| 2,700,736 | A | 1/1955 | Roberts |
| 9,097,588 | B2 | 8/2015 | Mills et al. |
| 2005/0227369 | A1* | 10/2005 | Richardson ........ G01N 33/2888 436/169 |

FOREIGN PATENT DOCUMENTS

| | | |
|---|---|---|
| CN | 109358051 A | 2/2019 |
| DE | 4040584 A1 | 6/1992 |
| GB | 360402 A | 10/1931 |
| GB | 888039 A | 1/1962 |
| GB | 917882 A | 2/1963 |
| GB | 1506401 A | 4/1978 |
| GN | 103217503 A | 7/2013 |
| KR | 101605193 B1 | 3/2016 |

OTHER PUBLICATIONS

"A2O Water—Made in USA, pH Test Liquid (WHT/100-125 tests)"; printed on Mar. 11, 2021 from https://www.amazon.com/dp/B008BMJ8M0/?tag=googhydr-20&hvadid=186574649169&hvpos=1t1&hvnetw=g&hvrand=10149532861567766216&hvpone=&hvptwo=&hvqmt=e&hvdev=c&hvdvcmdi=&hviocint=&hvlocphy=9007555&hvtargid=kwd-291328074405&ref=pd_sl_2djo3kmz3t_e.
Fox et al. "Emergency First Responders' Experience With Colorimetric Detection Methods," Idaho National Laboratory, Oct. 2007.
Shokrollahi et al. "Determination of the acidity constants of neutral red and bromocresol green by solution scanometric method and comparison with spectrophotometric results." Beni-Suef University Journal of Basic and Applied Sciences 5.1 (2016): 13-20.

* cited by examiner

*Primary Examiner* — Yara B Green
(74) *Attorney, Agent, or Firm* — Nath, Goldberg & Meyer; Richard C. Litman

(57) ABSTRACT

The method and kit for detecting technetium-99m radioisotopes provide color-change solutions for visual detection of technetium-99m radioisotope-based tracers. A first color-change solution is formed from a mixture of thymol blue sodium salt solution and bromocresol purple solution. A first sample to be tested is determined to be a substance containing technetium-99m radioisotopes when the first sample to be tested turns yellow in color following spraying with the first color-change solution. A second color-change solution is formed from a mixture of bromocresol green solution and neutral red solution. A second sample to be tested is determined to be a substance containing technetium-99m radioisotopes when the second sample to be tested turns purple in color following spraying with the second color-change solution. The method and kit provide a rapid test for distinguishing a spill of radioactive TC-99m tracer from a saline spill in a nuclear medicine facility.

7 Claims, No Drawings

METHOD AND KIT FOR DETECTING TECHNETIUM-99M RADIOISOTOPES

BACKGROUND

1. Field

The disclosure of the present patent application relates to the detection of radioactive materials for safety of workers in nuclear medicine, and particularly to a method and kit for visually detecting the presence of technetium-99m ($^{99m}$Tc) radioisotopes to rapidly distinguish a spill of a Tc-99m tracer from a spill of saline.

2. Description of the Related Art

Technetium-99m ($^{99m}$Tc) is a metastable nuclear isomer of technetium-99 (which is, itself, an isotope of technetium) that is used in a very wide variety of medical diagnostic procedures. Many different types of technetium-99m-based tracers have an appearance which is virtually indistinguishable from common saline solution. Given how common saline solution is in medical procedures and medical environments, and that technetium-99m-based tracers are radioactive in nature, it is of critical importance to be able to distinguish spilled technetium-99m-based tracers from saline, and vice versa. Although radiation detectors, such as Geiger counters, are common in laboratory settings, they are often bulky and inconvenient to use, particularly in a medical environment. Thus, a method and kit for detecting technetium-99m radioisotopes solving the aforementioned problems are desired.

SUMMARY

The method for detecting technetium-99m radioisotopes includes the step of spraying a color-change solution on a sample to be tested. The color-change solution is formed from a mixture of thymol blue sodium salt solution and bromocresol purple solution. The ratio of thymol blue sodium salt solution to bromocresol purple solution in the mixture may be 1:1 by volume. If the sample being tested turns yellow, this indicates the presence of a substance containing technetium-99m radioisotopes, such as technetium tetrofosmin (sold commercially as Myoview®); technetium-99m-dimercaptosuccinic acid ($^{99m}$Tc-DMSA); technetium-99m-mercaptoacetyltriglycine ($^{99m}$Tc-MAG3); technetium-99m-nanocolloid; technetium-99m-tin colloid; technetium-99m-diethylenetriaminepentaacetic acid ($^{99m}$Tc-DTPA); technetium-99m-macroaggregated albumin ($^{99m}$Tc-MAA); and sestamibi (a coordination complex consisting of $^{99m}$Tc bound to six (sesta=6) methoxyisobutylisonitrile (MIBI) ligands).

Alternatively, the color-change solution may be formed from a mixture of bromocresol green solution and neutral red solution. The ratio of bromocresol green solution to neutral red solution in the mixture may be 1:1 by volume. If the sample being tested turns purple, this indicates the presence of a substance containing technetium-99m radioisotopes, such as technetium-99m-N-(2,6-dimethyl-phenyl-carbamoyl-methyl)-iminodiacetic acid ($^{99m}$Tc-HIDA).

Both color-change mixtures described above may be provided together in a kit, providing a kit for broad-spectrum detection of technetium-99m radioisotope-containing substances.

These and other features of the present subject matter will become readily apparent upon further review of the following specification.

DETAILED DESCRIPTION OF THE PREFERRED EMBODIMENTS

The method for detecting technetium-99m radioisotopes includes the step of spraying a color-change solution on a sample to be tested. The color-change solution is formed from a mixture of thymol blue (thymolsulfonephthalein) sodium salt solution and bromocresol purple (5',5"-dibromo-o-cresolsulfophthalein) solution. The ratio of thymol blue sodium salt solution to bromocresol purple solution in the mixture is 1:1 by volume. As is well known, thymol blue and bromocresol purple are pH indicators. If the sample being tested turns yellow, this indicates the presence of a substance containing technetium-99m radioisotopes, such as technetium tetrofosmin (sold commercially as Myoview®, which has a pH of 5.8); technetium-99m-dimercaptosuccinic acid ($^{99m}$Tc-DMSA, which has a pH of 3.6); technetium-99m-mercaptoacetyltriglycine ($^{99m}$Tc-MAG3, which has a pH of 5.0); technetium-99m-nanocolloid (which has a pH of 6.5); technetium-99m-tin colloid (which has a pH of 4.5); technetium-99m-diethylenetriaminepentaacetic acid ($^{99m}$Tc-DTPA, which has a pH of 4.4); technetium-99m-macroaggregated albumin ($^{99m}$Tc-MAA, which has a pH of 5.5); and sestamibi (a coordination complex consisting of $^{99m}$Tc bound to six (sesta=6) methoxyisobutylisonitrile (MIBI) ligands, which has a pH of 4.5). For purposes of comparison, a saline solution sample was tested with a pH of 5.0.

The thymol blue sodium salt solution may be prepared by mixing 50 mg of thymol blue sodium salt in 1.075 mL of 0.1 M NaOH and 10 mL of ethanol, and adding water to bring the solution up to 50 mL volume. Alternatively, the thymol blue sodium chloride solution may be prepared by mixing 20 mg of thymol blue sodium salt in 4.3 mL of 0.01 M NaOH, and adding water to bring the solution up to 50 mL volume. The bromocresol purple solution may be prepared by mixing 20 mg of bromocresol purple in 3.7 mL of 0.01 M NaOH, and adding water to bring the solution up to 50 mL volume. The spray may be made by mixing a 1:1 ratio by volume of the thymol blue sodium salt and bromocresol purple solutions. When a spill of transparent liquid is sprayed with the mixture, the indicator mixture will turn the spill yellow if a TC-99m tracer (except HIDA) is present, but the indicator mixture will not change color if the spill is simply a saline solution. This provides laboratory technicians in nuclear medicine with a rapid test to determine whether measures dealing with a spill of radioactive material are necessary.

Alternatively, the color-change solution may be formed from a mixture of bromocresol green (3,3',5,5'-tetrabromo-m-cresolsulfonphthalein) solution and neutral red ($N^2,N^2$,7-trimethylphenazine-2,8-diamine) solution. The ratio of bromocresol green solution to neutral red solution in the mixture is 1:1 by volume. As is well known, bromocresol green and neutral red are pH indicators. If the sample being tested turns purple, this indicates the presence of a substance containing the technetium-99m radioisotope technetium-99m-N-(2,6-dimethyl-phenyl-carbamoyl-methyl)-iminodiacetic acid ($^{99m}$Tc-HIDA, which has a pH of 6.5).

The bromocresol green solution may be prepared by mixing 25 mg of bromocresol green in 0.36 mL of 0.1 M NaOH and 10 mL of ethanol, and adding water to bring the solution up to 50 mL volume. Alternatively, the bromocresol green solution may be prepared by mixing 20 mg of bromocresol green in 2.86 mL of 0.01 M NaOH, and adding water to bring the solution up to 50 mL volume. The neutral red solution may be prepared by mixing 5 mg of neutral red in 25 mL of ethanol, and adding water to bring the solution up to 50 mL volume. The spray may be made by mixing a 1:1 ratio by volume of the bromocresol green and neutral red solutions. When a spill of transparent liquid is sprayed with the mixture, the indicator mixture will turn the spill purple if the HIDA TC-99m tracer is present, but the indicator mixture will not turn color if the spill is simply a saline solution. This provides laboratory technicians in nuclear medicine with a rapid test to determine whether measures dealing with a spill of radioactive material are necessary.

Both color-change mixtures described above may be provided together in a kit, providing a kit for broad-spectrum detection of technetium-99m radioisotope-containing substances.

It is to be understood that the method and kit for detecting technetium-99m radioisotopes is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A method for detecting technetium-99m radioisotopes, comprising the steps of:
   spraying a color-change solution on a sample to be tested, the color-change solution comprising a mixture of thymol blue sodium salt solution and bromocresol purple solution;
   determining that the sprayed sample contains at least one technetium-99m radioisotope when the color-change solution in the sprayed sample turns yellow in color.

2. The method for detecting technetium-99m radioisotopes as recited in claim 1, wherein the mixture of the thymol blue sodium salt solution and the bromocresol purple solution has a 1:1 ratio of the thymol blue sodium salt solution and the bromocresol purple solution by volume.

3. A method for detecting technetium-99m radioisotopes, comprising the steps of:
   spraying a color-change solution on a sample to be tested, the color-change solution comprising a mixture of bromocresol green solution and neutral red solution;
   determining that the sprayed sample contains at least one technetium-99m radioisotope when the color-change solution in the sprayed sample turns purple in color.

4. The method for detecting technetium-99m radioisotopes as recited in claim 3, wherein the mixture of the bromocresol green solution and the neutral red solution has a 1:1 ratio of the bromocresol green solution and the neutral red solution by volume.

5. A kit for distinguishing a spill containing a radioactive technetium-99m tracer from a saline spill in a nuclear medicine facility, the kit comprising:
   a first indicator solution including a mixture of thymol blue sodium salt solution and bromocresol purple solution for spraying on the spill, the first indicator solution detecting a technetium-99m tracer when the spill turns yellow in color following spraying with the first color-change solution; and
   a second indicator solution including a mixture of bromocresol green solution and neutral red solution for spraying on the spill, the second indicator solution detecting a technetium-99m tracer when the spill turns purple in color following spraying with the second indicator solution.

6. The kit for distinguishing a spill containing a radioactive technetium-99m tracer as recited in claim 5, wherein the mixture of the thymol blue sodium salt solution and the bromocresol purple solution has a 1:1 ratio of the thymol blue sodium salt solution and the bromocresol purple solution by volume.

7. The kit for distinguishing a spill containing a radioactive technetium-99m tracer as recited in claim 6, wherein the mixture of the bromocresol green solution and the neutral red solution has a 1:1 ratio of the bromocresol green solution and the neutral red solution by volume.

* * * * *